US008732703B2

(12) United States Patent
Graves (10) Patent No.: US 8,732,703 B2
(45) Date of Patent: May 20, 2014

(54) VERIFYING VIRTUAL MACHINES (75) Inventor: David Graves, Monte Sereno, CA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 198 days.

(21) Appl. No.: 13/146,119

(22) PCT Filed: Jan. 23, 2009

(86) PCT No.: PCT/US2009/031898
§ 371 (c)(1),
(2), (4) Date: Jul. 25, 2011

(87) PCT Pub. No.: WO2010/085255
PCT Pub. Date: Jul. 29, 2010

(65) Prior Publication Data
US 2011/0283279 A1   Nov. 17, 2011

(51) Int. Cl.
*G06F 9/455* (2006.01)
(52) U.S. Cl.
USPC .................................................. 718/1
(58) Field of Classification Search
None
See application file for complete search history.

(56) References Cited

U.S. PATENT DOCUMENTS

| 7,096,350 | B2 * | 8/2006 | Graves et al. | 713/1 |
| 7,184,942 | B2 | 2/2007 | Graves et al. | |
| 2004/0249916 | A1 * | 12/2004 | Graves et al. | 709/223 |
| 2006/0184936 | A1 | 8/2006 | Abels et al. | |
| 2008/0019365 | A1 * | 1/2008 | Tripathi et al. | 370/392 |
| 2008/0098392 | A1 | 4/2008 | Wipfel et al. | |
| 2008/0163239 | A1 * | 7/2008 | Sugumar et al. | 718/105 |
| 2008/0235534 | A1 * | 9/2008 | Schunter et al. | 714/8 |
| 2008/0256639 | A1 | 10/2008 | Onoda et al. | |
| 2009/0169017 | A1 * | 7/2009 | Smith et al. | 380/278 |

OTHER PUBLICATIONS

Tal Garfinkel et al. (Terra: a virtual machine-based platform for trusted computing, 2003).*
Korean Intellectual Property Office, International Search Report, Oct. 23, 2009, 4 pages, Daejeon, Republic of Korea.
European Patent Office, Extended European Search Report, Oct. 31, 2012, 8 pages, The Hague, The Netherlands.
Garfinkel, T, Terra: a virtual machine-based platform for trusted computing, Oct. 19, 2003, pp. 193-206.

* cited by examiner

*Primary Examiner* — Emerson Puente
*Assistant Examiner* — Sisley Kim (57) ABSTRACT According to one embodiment, virtual machine attributes are verified. Information (142) about attributes for a virtual machine (152) is obtained (320) from a host machine (120) that the virtual machine (152) executes on. Actual virtual machine attributes (162) are obtained 330 from the virtual machine (152). Discrepancies between the information (142) about the attributes and the actual virtual machine attributes (162) are determined (340) by comparing the information (142) about the attributes to the actual virtual machine attributes (162).

12 Claims, 4 Drawing Sheets

VERIFYING VIRTUAL MACHINES

BACKGROUND

Modern data centers often employ virtual server technology, where a large number of virtualized computer servers execute on a relatively smaller number of host servers. The host servers are examples of what are known as "host machines" and the virtualized computer servers are examples of what are known as "virtual machines."

A malicious individual may reconfigure a virtual machine to perpetrate a crime. For example, the malicious individual may increase the number of processors and the network bandwidth in preparation for performing a Denial of Service (DOS) attack across a network. In another example, the malicious individual may increase a virtual machine's disk space, for example, in order to hide information. Further, the malicious individual may place constructs on the virtual machine so that the virtual machine will report that it has the expected configuration to mask or hide the malicious modifications that were made. The malicious individual may also place constructs on the host machine to hide the malicious modification. Providing due care to ensure the security and integrity of virtual machines can be expensive.

BRIEF DESCRIPTION OF THE DRAWINGS

The accompanying drawings, which are incorporated in and form a part of this Description of Embodiments, illustrate various embodiments of the present invention and, together with the description, serve to explain principles discussed below.

The drawings referred to in this Brief Description should not be understood as being drawn to scale unless specifically noted.

DESCRIPTION OF EMBODIMENTS

Reference will now be made in detail to various embodiments of the subject matter, examples of which are illustrated in the accompanying drawings. While various embodiments are discussed herein, it will be understood that they are not intended to limit to these embodiments. On the contrary, the presented embodiments are intended to cover alternatives, modifications and equivalents, which may be included within the spirit and scope the various embodiments as defined by the appended claims. Furthermore, in the following Description of Embodiments, numerous specific details are set forth in order to provide a thorough understanding of embodiments of the present subject matter. However, embodiments may be practiced without these specific details. In other instances, well known methods, procedures, components, and circuits have not been described in detail as not to unnecessarily obscure aspects of the described embodiments.

Notation and Nomenclature

Unless specifically stated otherwise as apparent from the following discussions, it is appreciated that throughout the present Description of Embodiments, discussions utilizing terms such as "obtaining", "accessing," "determining," "using," "communicating," "selecting," "receiving,", "generating," "reporting," "using," "provisioning," "configuring," "modifying," "verifying," or the like, refer to the actions and processes of a computer system, or electronic computing device. The computer system or similar electronic computing device manipulates and transforms data represented as physical (electronic) quantities within the computer system's registers and memories into other data similarly represented as physical quantities within the computer system memories or registers or other such information storage, transmission, or display devices. Some embodiments of the subject matter are also well suited to the use of other computer systems such as, for example, optical and virtual computers.

Introduction of Discussion

Figure 1:
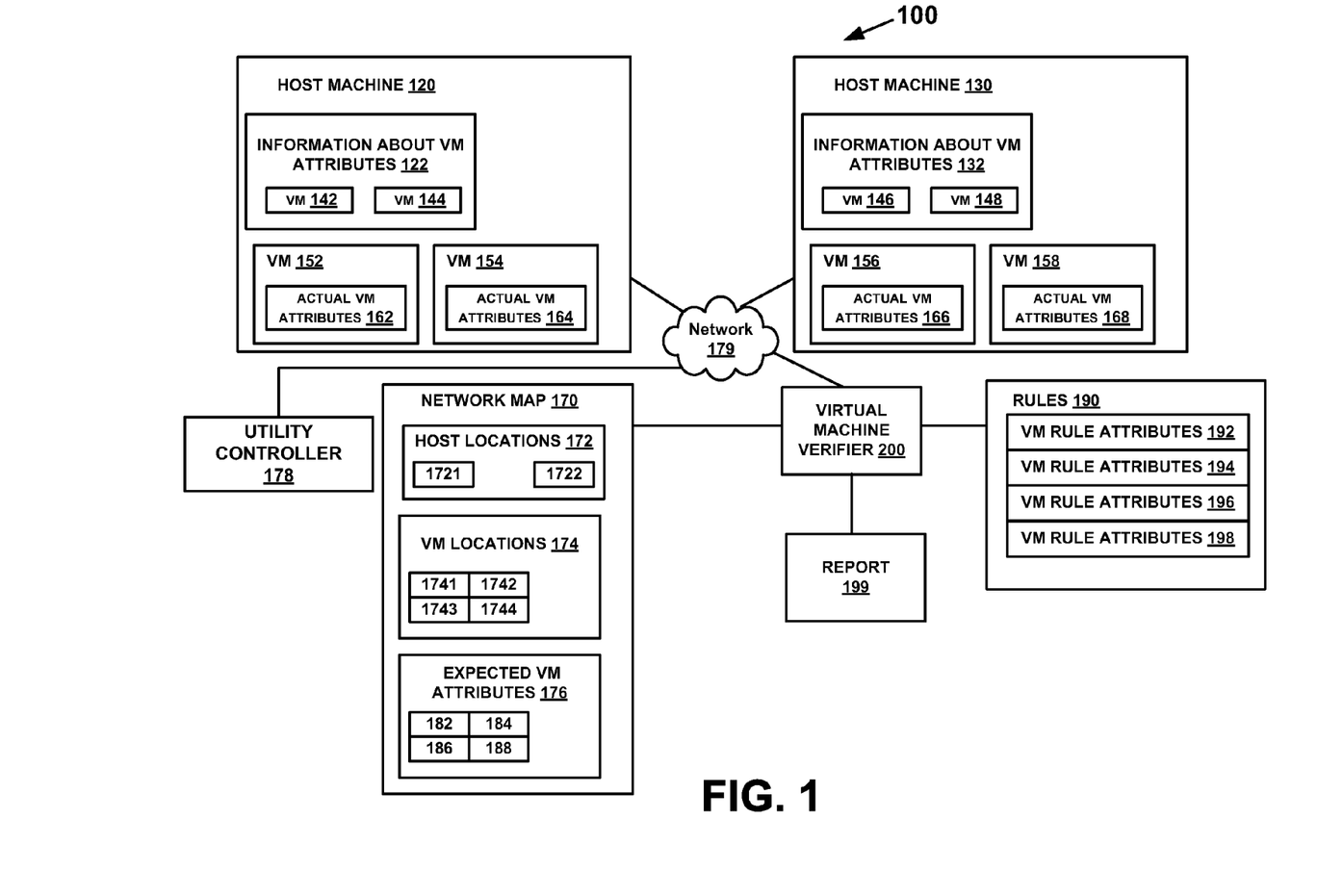
FIG. 1 is a block diagram of a system used for verifying virtual machine attributes, according to one embodiment.

Referring to FIG. 1, with the advent of virtualization, virtual machines 152, 154, 156, 158 can be executed on host machines 120, 130. The virtual machines 152, 154, 156, 158 have respective attributes 162, 164, 166, 168 that they are configured to execute with (referred to herein as "actual virtual machine attributes"). A few examples of virtual machine attributes include the number of allocated processors, the amount of memory allocated, and the number and size of storage disks.

The host machines 120, 130 may also have information 122, 132 about their respective virtual machine 152, 154, 156, 158's attributes. For example, VMs 152 and 154 execute on host machine 120. VMs 156 and 158 execute on host machine 130. Host machine 120 has information 142 about VM 152's attributes and information 144 about VM 154's attributes. Host machine 130 has information 146 about VM 156's attributes and information 148 about VM 158's attributes.

There may be discrepancies between the information 142, 144, 146, 148 that a host machine 120, 130 has about a virtual machine 152, 154, 156, 158 and the VM 152, 154, 156, 158's actual attributes 162, 164, 166, 168. For example, a malicious person may modify the actual attributes 162, 164, 166, 168 in order to perpetrate a crime. In another example, there may be discrepancies due to configuration errors or programming errors. Therefore, according to one embodiment, a virtual machine verifier 200 compares a host machine 120, 130's information 142, 144, 146, 148 about attributes for virtual machines with the actual virtual machine attributes 162, 164, 166, 168 to determine if there are any discrepancies.

A host machine 120, 130's information 142, 144, 146, 148 about its respective virtual machines 152, 154, 156, 158 and the actual VM attributes 162, 164, 166, 168 are examples of sources of information pertaining to virtual machine attributes that can be compared to determine if there are discrepancies. Other examples of sources of information pertaining to virtual machine attributes are expected attributes 176, associated with a network map 170, and rules 190. According to various embodiments, the virtual machine verifier 200 can compare various combinations of host 120, 130s' information 122, 132, actual attributes 162, 164, 166, 168, expected attributes 176, and rules 190 to determine if there are discrepancies between any two or more of them. The virtual machine verifier 200, according to one embodiment, generates a report 199 that includes one or more of the discrepancies that the virtual machine verifier 200 determined. As described herein, the virtual machine verifier 200 determines discrepancies automatically. The virtual machine verifier 200 can, for instance, continuously or periodically determine the discrepancies.

The virtual machine verifier 200 may communicate with or access any one or more of a host machine 120, 130, the network map 170, and the rules 190, for example, over a network 179. The network 179 may be a local area network or the Internet.

Utility Data Center

A utility data center (UDC) is used for automatically and dynamically provisioning resources, from a pool of resources, to create computing environments known as "farms" of resources. The UDC can return the resources to the pool when a computing environment is no longer used. The UDC can use the returned resources to automatically and dynamically provision another computing environment (also commonly known as "re-provisioning"). Examples of resources that can be provisioned and re-provisioned are storage, networking fabric, servers, switches, computers, appliances and network elements, such as routers, and virtual machines, among other things. Servers and computers are examples of "computing resources." Load balancers and firewalls are examples of "appliances."

A utility controller (UC) 178 (FIG. 1) is typically associated with a UDC. A utility controller 178 manages the pool of resources, and ensures the segmentation of the farms to provide secure isolation of one farm from other farms, among other things. Computing resources and appliances are typically dedicated to a farm (also known as "dedicated resources"), whereas, storage and networking fabric can be shared (also known as "shared resources") between farms. A utility controller 178 may monitor shared resources, alert a network operation center of failures or significant events, such as attempts at intrusion.

A utility controller 178 can be used for updating a network map 170. The utility controller 178, according to one embodiment, uses a network map 170 as a guide to the resources that are associated with a data center. The utility controller 178 can update the network map 170, for example, each time a new resource is provisioned, configured, re-provisioned, or re-configured by the utility controller. The term "provisioned" shall include initial provisioning and re-provisioning. The term "configuring" shall include initial configuring and re-configuring.

Examples of utility controllers 178 include but are not limited to HP™ Insight Control, HP™ Virtual connect, HP™ Insight Dynamics Virtual Server Environment (VSE), HP™ Storage Works. Examples of utility data centers include but are not limited to HP™'s Adaptive Infrastructure as a Service, and HP™'s Flexible Computing Services.

One or more utility controller products can be used to automate a data center using, for example, a utility computing model for providing data center resources dynamically for example by provisioning and re-provisioning resources, as needed. Such a data center could be called a Utility Data Center. The term "Cloud Computing" has also been applied to this type of data center. Using a data center, customers can purchase computing power and information storage that is delivered over the Internet.

Host Machines and Virtual Machines

Host machines 120, 130, according to one embodiment, are hardware with operating systems that enable virtual machines 152, 154, 156, 158 to execute on the host machines 120, 130. A host machine 120, 130 may be a server machine.

A virtual machine 152, 154, 156, 158 is, according to one embodiment, a system image that executes on top of a host machine 120, 130's operating system. The virtual machine 152, 154, 156, 158 operates as if it is a machine itself. One example of a virtual machine software product is VMware Inc.™'s VMware™ product.

A malicious individual may exploit the security facilities associated with a virtual machine 152, 154, 156, 158 in order to modify a virtual machine 152, 154, 156, 158's actual attributes 162, 164, 166, 168 or to modify a host machine 120, 130's information 122, 132 about a virtual machine's attributes, or a combination thereof, as will become more evident. Various embodiments provide for detecting malicious modifications.

Host machines 120, 130 and virtual machines 152, 154, 156, 158 may be controlled and configured with commands issued by administrators in a network operation center (NOC). A utility controller (UC) can be used to automatically provision and configure virtual machines on host machines.

Virtual Machine Attributes

Virtual machine attributes are attributes that virtual machines are configured with. Examples of virtual machine attributes include, but are not limited to, the number of processors allocated to a virtual machine, the amount of memory allocated to a virtual machine, the number and size of storage disks used by a virtual machine, the maximum input/output (I/O) rate of a disk channel, the number of Network Interface Cards (NICs) associated with a virtual machine, the maximum I/O rate for each NIC.

The virtual machine attributes that a virtual machine is actually configured with are referred to as "actual virtual machine attributes." Examples of actual VM attributes are 162, 164, 166, 168. A host machine 120, 130 may also include information 122, 132 about what the host machine 120, 130 understands the attributes 142, 144, 146, 148 of its virtual machines 152, 154, 156, 158 to be. For example, host machine 120 has information 142 and 144 about the virtual machines 152, 154 that are executing on it and host machine 130 has information 146 and 148 about virtual machines 156, 158 that are executing on it.

A network map 170 includes attributes that the virtual machines 152, 154, 156, 158 are expected to have. These attributes are referred to as "expected virtual machine attributes." Expected virtual machine attributes 182, 184, 186, 188 that correspond respectively to virtual machines 152, 154, 156, and 158 are examples of the network map 170's expected virtual machine attributes.

Rules 190 can also be used to determine information about virtual machine attributes. The attributes 192, 194, 196, 198 that can be determined based on the rules 190 shall be referred to as "VM rule attributes."

Network Map

A network map 170, according to one embodiment, stores the expected VM attributes 176 for the virtual machines 152, 154, 156, 158 hosted by host machines 120, 130 associated, for example, with a data center. According to one embodiment, the network map 170 is machine-readable. A network map 170 may be updated automatically by a utility controller. However, a network map 170 may be updated manually by administrators associated with a network operations center. Therefore, a network map 170 can be used as a part of verifying virtual machine attributes even in a system 100 does not include a utility controller.

A network map 170 can include expected attributes 182, 184, 186, 188 for respective virtual machines 152, 154, 156,

158. As depicted in FIG. 1, expected VM attributes 182 pertain to VM 152, expected VM attributes 184 pertain to VM 154, expected VM attributes 186 pertain to VM 156, and expected VM attributes 188 pertain to VM 158.

A network map 170 may include locations 172 of host machines 120, 130 and locations 174 of virtual machines 152, 154, 156, 158. Host machine 120's location is stored as location 1721 and host machine 130's location is stored as location 1722 of the network map 170's host locations 172. VM 152's location is stored as location 1741, VM 154's location is stored as location 1742, VM 156's location is stored as location 1743, and VM 158's location is stored as location 1744. A location 172, 1722, 1741-1744 of either a host machine 120, 130 or a virtual machine 154, 154, 156, 158, according to one embodiment, is an internet protocol (IP) address.

For the sake of simplicity, the host locations 172, the VM locations 174, and the expected VM attributes 176 are depicted separately in the network map 170. However, according to one embodiment, information pertaining to a host machine is grouped together and information pertaining to a virtual machine is grouped together. For example, a host's location and the virtual machines that execute on that host may be grouped with the host. A virtual machine's location and the virtual machine's expected attributes may be grouped together. More specifically, the network map 170 may include its contents in the order depicted in Table 2.

Table 2 an order that contents are associated with a network map 170, according to one embodiment.

| Description | Reference Number |
|---|---|
| Host 120's location | 1721 |
| VM 152's location | 1741 |
| VM 152's expected attributes | 182 |
| VM 154's location | 1742 |
| VM 154's expected attributes | 184 |
| Host 130's location | 1722 |
| VM 156's location | 1743 |
| VM 156's expected attributes | 186 |
| VM 158's location | 1744 |
| VM 158's expected attributes | 188 |

According to one embodiment, the various sources of information about VM attributes are accessed in the order that the information appears the network map 170. Continuing the example, host 120's location 1721 is accessed from the network map 170 and used to locate host 120 and to access information 122 about virtual machines' attributes. VM 152's location 1741 is accessed in the network map 170 and used to access the VM 152's actual attributes 162. VM 152's actual attributes 162 can be compared to VM 152's expected attributes 182. VM 154's location 1742 is accessed in the network map 170 and used to access the VM 154's actual attributes 164 and so on.

According to one embodiment, a network map 170 does not include expected VM attributes 176. In this case, various embodiments may use either the host locations 172 or the VM locations 174, or a combination thereof. According to one embodiment, a network map 170 does not include VM locations 174. In this case, various embodiments may use the host locations 172 to access a host machine 120, 130. The host machine 120, 130 can provide locations of their respective VMs 152-158.

According to one embodiment, the network map 170 is stored in a database. According to one embodiment, the network map 170 is a "Configuration Management Database" or a CMDB.

Rules

Rules 190 provide a way of specifying policies about expected or forbidden configurations, such as expected or forbidden VM attributes. Violations of the rules 190 allow discovering configurations that are the result of humor error or malicious activity. Rules 190 can include specified minimum and maximum values for attributes that are used to configure a virtual machine, as well as constraints for relationships between attributes. The rules 190 can be easily adapted to reflect different policies for different data centers. According to one embodiment, rules 190 are written in eXtended Markup Language (XML). Although many of the examples of rules 190 use XML, any language that provides a syntax that could be used for specifying rules 190 can be used.

Rules 190 can include VM rule attributes 192, 194, 196, 198 that include one or more rules for a VM 152-158. As depicted in FIG. 1, the VM rule attributes 192 pertain to VM 152, the VM rule attributes 194 pertain to VM 154, the VM rule attributes 196 pertain to VM 156, and the VM rule attributes 198 pertain to VM 158. For the sake of simplicity, the rules 190 are depicted with VM rule attributes 192, 194, 196, 198 for each of the VMs 152, 154, 156, 158. However, a rule may pertain to more than one VM 152, 154, 156, 158. For example, VM rule attributes 192 and VM rule attributes 196 may both include one or more of the same rules. Table 1 below depicts several exemplary rules.

TABLE 1

Exemplary Rules

| Rule No. | The Rule |
|---|---|
| 1 | `<rule name="number of processors in a VM">`<br>    `<dependencies>` /* there are no dependencies for this rule */<br>    `</dependencies>`<br>    `<specifications>` `<min-processors>` 1 `</min-processors>`<br>                                  `<max-processors>` 8 `</max-processors>`<br>    `</specifications>`<br>    `</rule>` |
| 2 | `<rule name="memory for a single processor VM">`<br>    `<dependencies>` `<processors>` 1 `</processors>` `</dependencies>`<br>    `<specifications>` `<min-memory>` 200 Mb `</min-memory>`<br>                                    `<max-memory>` 400 Mb `</max-memory>` |

TABLE 1-continued

Exemplary Rules

| Rule No. | The Rule |
|---|---|
| | </specifications><br></rule> |
| 3 | <rule name="disk for two processor VM"><br>    <dependencies>        <processors> 2 </processors> </dependencies.<br>    <specifications>    <min-disk> 2 Gb </min-disk><br>                       <max-disk> 4 Gb </max-disk>    </specifications><br></rule> |
| 4 | <rule name="disk-to-memory ratio"><br>    <dependencies>        <min-disk> 1 Gb </min-disk><br>                       <max-disk> 2 Gb </max-disk> </dependencies.<br>    <specifications>    <min-memory> 200 Mb </min-memory><br>                       <max-memory> 400 Mb </max-memory><br></specifications><br></rule> |
| 5 | <rule name="number of VMs in a large host server, model name "Super-Alpha"><br>    <dependencies>    <host-model> Super-Alpha </host-model><br></dependencies><br>    <specifications>    <min-VMs> 0 </min-VMs><br>                     <max-VMs> 16 </max-VMs>    </specifications.<br>    /* If a Super-Alpha host server had seventeen or more VMs, then this rule is violated */ </rule> |
| 6 | <rule name="number of VMs in a small host server, model name "Alpha-Low"><br>    <dependencies>    <host-model> Alpha-Low </host-model><br></dependencies><br>    <specifications>    <min-VMs> 0 </min-VMs><br>                     <max-VMs> 4 </max-VMs>    </specifications><br>    /* If an Alpha-Low host server had five or more VMs, then this rule is violated */<br></ rule> |

As depicted in Table 1, each rule 1-6 includes various clauses. A syntax is used to describe the rules and the clauses associated with those rules 1-6. Examples of clauses are a rule name, dependencies, specifications, among other things. Examples of syntax, include, among other things, a left bracket < followed by the name of the clause for introducing a clause and a left bracket followed by a slash, </, to end a clause. For example, the rule name is started with "<rule name= . . . >," the dependencies are started with "<dependencies>," and the specifications are started with "<specifications . . . >" The rule name is ended with </rule>, the dependencies are ended with </dependencies>, the specifications are ended with </specifications>. The contents of a clause can be found in between the start of the clause and the end of the clause. For example, referring to rule number 1, <min-processors> 1 </min-processors> <max-processors> 8 </max-processors> can be found in between <specifications>, which is the specification clause's start, and </specifications>, which is the specification clause's end.

Clauses can be embedded inside of other clauses. For example referring to rule 1, the clause "<min-processors> 1 </min-processors>" is embedded inside of a specification clause.

Rules 1-6 pertain to minimum and maximum values for various virtual machine attributes. Rule 1 specifies that a virtual machine may have no less than 1 processor and no more than 8 processors. Rule 2 refers to any virtual machines with a single processor in the dependency clause. The specification clause of rule 2 indicates that a single processor VM can have no less than 200 megabytes (MB) of memory and no more than 400 MBs of memory. Rule 3 refers to any virtual machines with two processors. The specification clause of rule 3 indicates that a double processor VM can have no less than 2 gigabytes (GBs) of disk space and no more than 4 GBs of disk space. Rule 4 is a disk to memory ratio rule. The dependency clause indicates that rule 4 applies to VMs with 1 GBs to 2 GBs of disk space. The specification clause of rule 4 indicates that any virtual machine with 1 GB to 2 GBs of disk space should have no less than 200 MBs of memory and no more than 400 MBs of memory. Rules 5 and 6 are used to categorize host machines based on the number of virtual machines associated with a host machine. Rule 5 pertains to large host machines, called "Super-Alphas," that can have any where from 0 to 16 VMs. Rule 6 pertains to smaller host machines, called "Alpha-Lows," that can have any where from 0 to 4 VMs. The names "Super-Alpha" and "Alpha-Low" are associated respectively with rules 5 and 6 using tags <host-model> and </host-model>.

VM rule attributes can be implemented using different types of rules such as VM attribute range rules and VM attribute relationship rules. Rule is depicted in table 1 is an example of a VM attribute range rule. Rule 4 depicted in table 1 is an example of a VM attribute relationship rule.

Rules 190 may also be used to specify that certain types of devices use a large amount of power and therefore can be connected to large switches whereas other types of devices use a relatively small amount of power and therefore can be connected to relatively small switches.

According to one embodiment, the rules 190 are stored in a database. The rules 190 and the network map 170 may be stored in the same database.

Discrepancies

A discrepancy between the various sources of information 122, 132, 162-168, 182-188, and 190 may be due to a configuration error, a programming error or the actions of a malicious individual, among other things. Examples of discrepancies include, among other things, that two or more of the sources of information 122, 132, 162-168, 182-188, and 190 have different values for virtual machine attributes. More specifically, one of the sources of information may indicate that a virtual machine has 1 processor while another source of information may indicate that the same virtual machine has 2 processors. Another example is that two of the sources of information indicate different amounts of storage for a virtual machine. The number of processors and the amount of allocated storage are just two examples of types of virtual machine attributes. Two or more sources of information may indicate a discrepancy for any type of virtual machine attribute. Sources of information include, but are not limited to actual VM attribute values, host machine information about VM attribute values, attributes determined via rules (also referred to as VM rule attributes) and expected values in the network map.

In yet another example, a discrepancy may be that two or more sources of information 122, 132, 162-168, 182-188, and 190 indicate different numbers of virtual machines. Since host machines 120, 130 are physical and can be seen, it can be determined by inspection if a host machine has been removed or added. However, virtual machines cannot be seen and therefore conventionally it is difficult to determine if a virtual machine has been added or removed, for example, from a host machine or a data center.

Despite whatever security measures may be taken to protect the facility, a malicious individual may be able to modify the actual VM attributes 162-168 of a virtual machine 152-158. The malicious individual may also be able to modify information 142, 144, 146, 148 that a host machine 120, 130 has about a virtual machine's attributes. For example, the malicious individual may modify the amount of storage allocated attribute in both VM 152's actual VM attributes 162 and the host machine 120's information 142 for the same virtual machine 152. In this case, comparing the value associated with the storage allocated attribute in the actual VM attributes 162 and the host machine 120's information 142 would not enable detection. However, the malicious modification can still be detected by computing a summation A of the amounts of storage indicated in the information 142 and 144 that the host machine 120 has for all of its virtual machines 152, 154 and computing a summation B of all of the amounts of storage indicated in the actual VM attributes 162, 164 for all of the virtual machines 152, 154 associated with the host machine 120, then comparing summation A with summation B. If a malicious individual stole storage from a virtual machine 152 and modified that virtual machine 152's actual VM attributes 162, there would be a discrepancy between summation A and summation B. If a malicious individual stole storage from a virtual machine 152 and modified that virtual machine 152's actual VM attributes 162 and the host machine 120's information 142 about the same virtual machine 152, there would be a discrepancy between summation A and the expected value in the network map 170, or a discrepancy between summation B and the network map 170, or both.

According to one embodiment, a host machine 120, 130's information 122, 132 about a virtual machine 152-158 or the virtual machine 152-158's actual VM attributes 162-168, or a combination thereof, are compared to the network map 170 or the rules 190, or a combination thereof. Even if a malicious individual was successful in modifying the actual VM attributes 162 of a virtual machine 152 and the host machine 120's information 142 about the virtual machine 152, that individual would not be able to modify either the network map 170 or the rules 190.

A Virtual Machine Verifier

Figure 2:
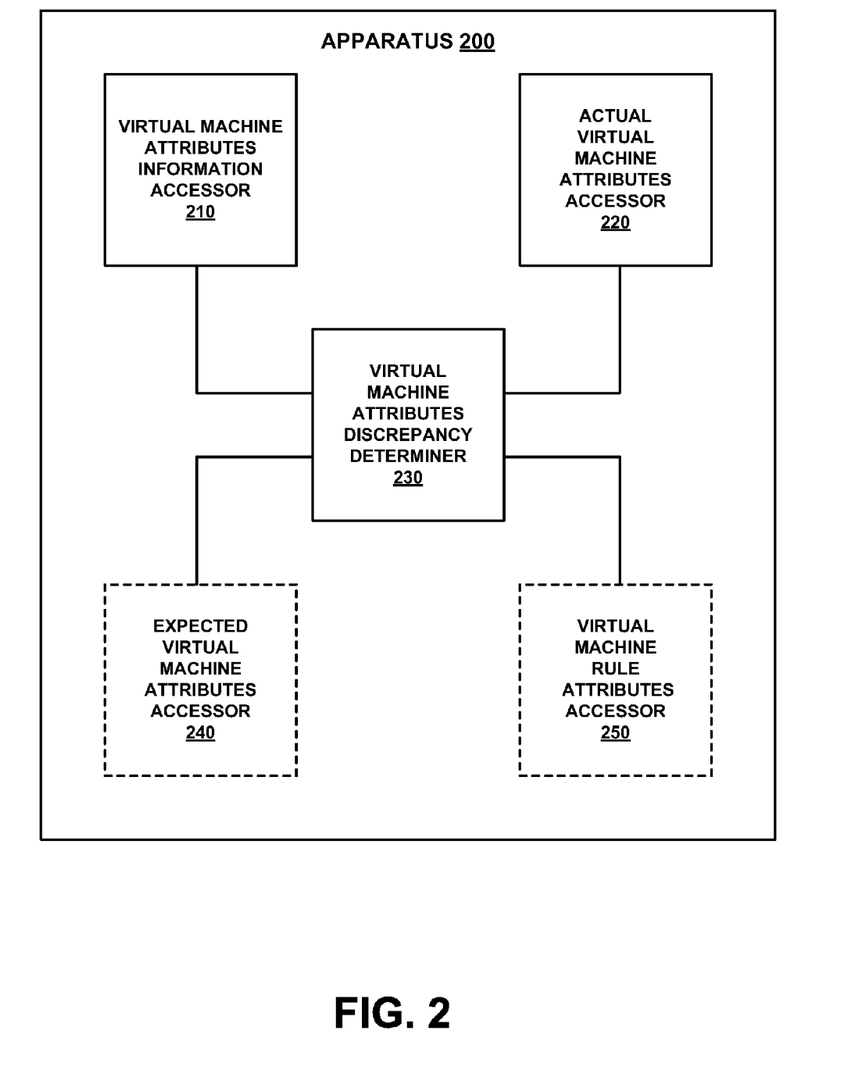
FIG. 2 is a block diagram of a virtual machine verifier for verifying virtual machine attributes, according to one embodiment.

FIG. 2 depicts a block diagram of a virtual machine verifier for verifying virtual machine attributes, according to one embodiment. The blocks that represent features in FIG. 2 can be arranged differently than as illustrated, and can implement additional or fewer features than what are described herein. Further, the features represented by the blocks in FIG. 2 can be combined in various ways. The virtual machine verifier 200 can be implemented using software, hardware, firmware, or a combination thereof.

As depicted in FIG. 2, the virtual machine verifier 200 includes a virtual-machine-attributes-information-accessor 210 (referred to herein as "attribute information accessor"), an actual-virtual-machine-attributes-accessor 220 (referred to herein as "actual attributes accessor"), a virtual-machine-attributes-discrepancy-determiner 230 (referred to herein as "discrepancy determiner"), and, in at least some embodiments, an expected-virtual-machine-attribute-accessor 240 (referred to herein as "expected attributes accessor"), and an virtual-machine-rule-attributes-accessor 250 (referred to herein as "rule attributes accessor").

The attribute information accessor 210 is configured for obtaining information about attributes for a virtual machine from a host machine that the virtual machine executes on. The actual attributes accessor 220 is configured for obtaining actual virtual machine attributes from the virtual machine. The discrepancy determiner 230 is configured for determining if there are discrepancies between the information about the attributes and the actual virtual machine attributes by comparing the information about the attributes to the actual virtual machine attributes.

The expected attributes accessor 240 is configured for accessing expected virtual machine attributes from a network map 170. The rule attributes accessor 250 is configured for accessing rules to obtain virtual machine rule attributes for a virtual machine.

According to one embodiment, the discrepancy determiner 230 determines discrepancies between any two or more of information 142 about VM attributes, actual VM attributes 162, expected VM attributes 182, and VM rule attributes 192 for a particular virtual machine 152.

According to one embodiment, the virtual machine verifier 200 is an apparatus. The apparatus may include a computer readable storage medium with instructions stored on it where the instructions implement 210, 220, 230, 240, 250, according to one embodiment. The apparatus may include a processor that executes the instructions stored on the computer readable storage medium.

Figure 3:
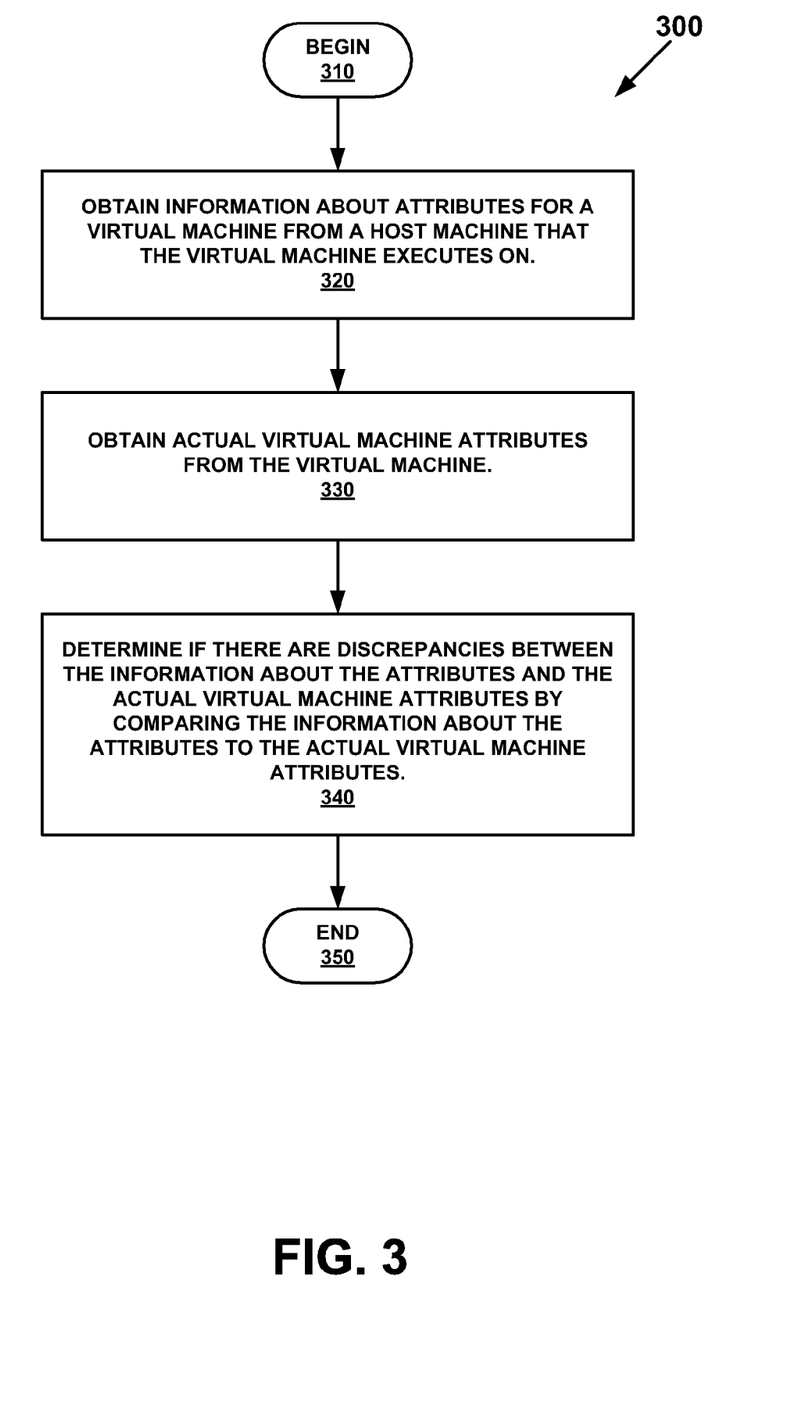
FIGS. 3 and 4 are block diagrams of flowcharts of computer implemented methods for verifying virtual machine attributes, according to various embodiments.
Figure 4:
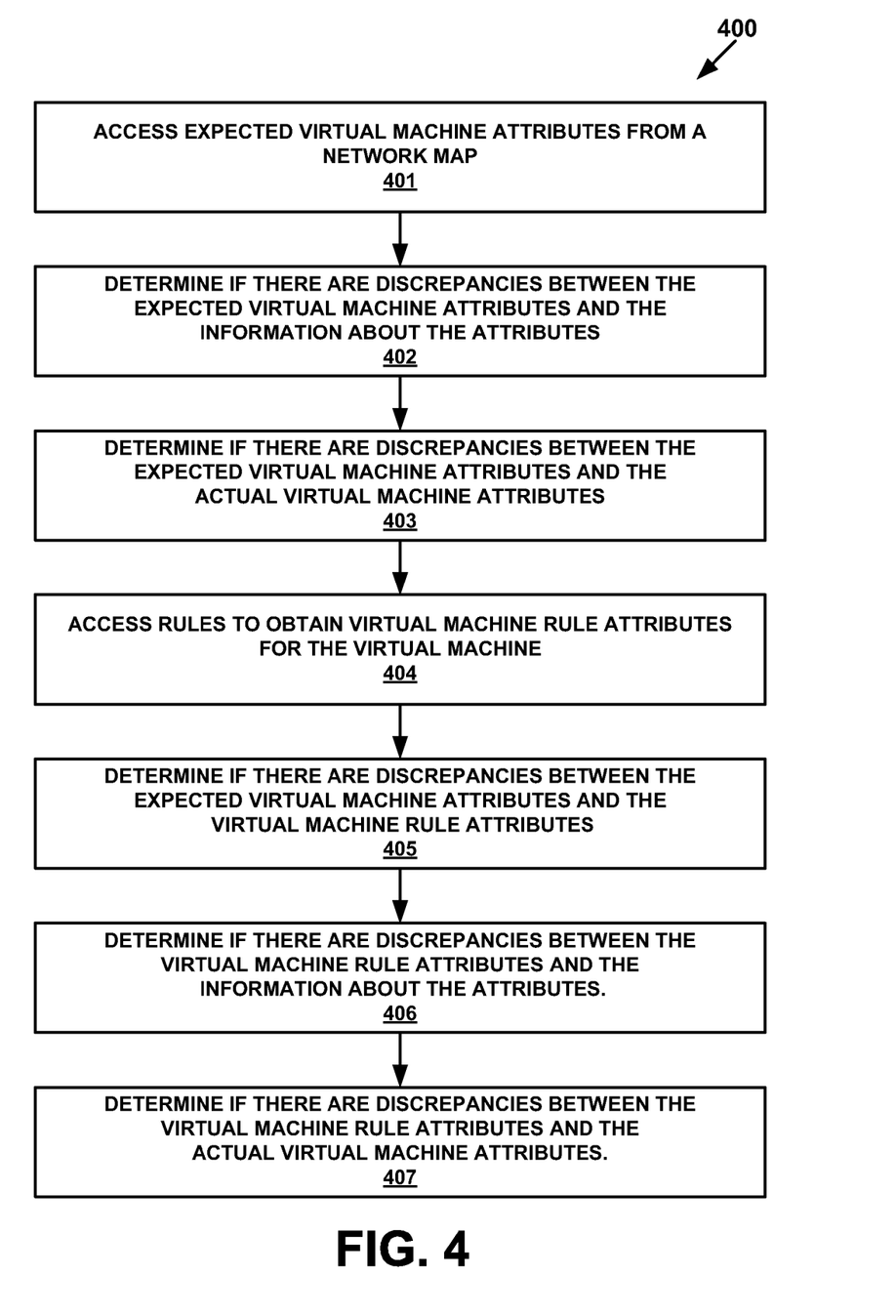

Illustration of a Computer Implemented Method For Verifying Virtual Machine Attributes FIGS. 3 and 4 are flowcharts of computer implemented methods for verifying virtual machine attributes, according to various embodiments. Although specific steps are disclosed in flowcharts 300 and 400, such steps are exemplary. That is, embodiments of the present invention are well suited to performing various other steps or variations of the steps recited in flowcharts 300 and 400. It is appreciated that the steps in flowcharts 300 and 400 may be performed in an order different than presented, and that not all of the steps in flowcharts 300 and 400 may be performed.

The following description of flowchart 300 (FIG. 3) refers to FIG. 1.

At 310, the method begins.

At 320, information 142 about attributes for a virtual machine 152 is obtained from a host machine 120 that the virtual machine 152 executes on. The location 1721 of the host machine 120 may be obtained from the network map 170 and used to obtain the information 142 from the host machine 120.

At 330, actual virtual machine attributes 162 are obtained from the virtual machine 152. The location 1741 of the virtual machine 152 may be obtained from the network map 170 and used to obtain the actual virtual machine attributes 162 from the virtual machine 152. Alternatively, the location of the virtual machine 152 may be obtained from the host machine 120 that hosts the virtual machine 152.

At 340, one or more discrepancies between the information 142 about the attributes and the actual virtual machine attributes 162 are determined by comparing the information 142 with the actual virtual machine attributes 162.

At 350, the method ends.

The following description of flowchart 400 (FIG. 4) refers to FIG. 1.

At 401, expected virtual machine attributes 182 for the virtual machine 152 are accessed from a network map 170.

At 402, discrepancies between the expected virtual machine attributes 182, obtained from the network map 170 at 401, and the information 142 about virtual machine 152's attributes obtained at 320 from the host machine 120 are determined.

At 403, discrepancies between the expected virtual machine attributes 182, obtained from the network map 170 at 401, and the actual virtual machine attributes 162 obtained at 330 from the virtual machine 152 are determined.

At 404, rules 190 are accessed to obtain virtual machine rule attributes 192 for the virtual machine 152. The rules 190 may include rules for more than one virtual machine 152, 154, 156, 158. Therefore, the rules 190 may be searched for attributes 192 that pertain to virtual machine 152.

At 405, discrepancies between the expected virtual machine attributes 182 that were obtained at 401 from the network map 170 and the virtual machine rule attributes 192, that were obtained from the rules 190 at 404, are determined.

At 406, discrepancies between the virtual machine rule attributes 192, which were obtained at 404, and the information 142 about virtual machine 152's attributes, that were obtained at 320 from the host machine 120, are determined.

At 407, discrepancies between the virtual machine rule attributes 192, which were obtained at 404, and the actual virtual machine attributes 162, that were obtained at 330, are determined.

A report of any one or more of the discrepancies that were determined at 340, 403, 405, or 406 (FIGS. 3 and 4) can be generated. The report 199 may be generated by the virtual machine verifier 200. The report 199 may be printed on paper or may be retained as digital information that is stored on an electronic device.

Although 320-340, and 401-406 were described in the context of actual virtual machine attributes 162 for virtual machine 152, information 142 about attributes for virtual machine 152 obtained from the host machine 120, the network map 170's expected attributes 182 that correspond to virtual machine 152, and virtual machine rule attributes 192, various embodiments are well suited for determining discrepancies between 144, 164, 184, and 194, or between 146, 166, 186, and 196, or between 148, 168, 188, and 198, among other things. In another example, a discrepancy may be determined by comparing groups of information to each other. In a specific example, a summation A of the amounts of storage reported in the information 142 and 144 that the host machine 120 has for all of its virtual machines 152, 154 can be computed and a summation B of all of the amounts of storage reported in the actual VM attributes 162, 164 for all of the virtual machines 152, 154 associated with the host machine 120 can be computed. The summation A can be compared with the summation B. If a malicious individual stole storage from a virtual machine 152 and modified that virtual machine 152's actual VM attributes 162 and the host machine 120's information 142 about that same virtual machine 152, there would be a discrepancy between summation A and summation B.

Although operations 401-407 are depicted in sequential order, other permutations of the operations 401-407 may be performed. For example, operations 401-403 may be performed without performing 404-407. Operations 401, 404 and 405 may be performed without performing operations 402, 403, 406 and 407. Operations 404, 406 and 407 may be performed without performing operations 401-403 and 405.

Further, as discussed herein, according to one embodiment, the various sources 122, 132, 162, 164, 166, 168, 182, 184, 186, 188, 190 of information about VM attributes are accessed in the order that information appears in the network map 170. Table 2 depicts an example of an order that information may appear in a network map 170.

According to one embodiment, the attribute information accessor 210 performs operation 220, the actual attributes accessor 220 performs operation 330, the expected attributes accessor 240 performs operation 401, the rule attributes accessor 250 performs operation 404, and the discrepancy determiner 230 performs operation 340. The discrepancy determiner 3230 may also perform any one or more of operations 402, 403, 405-407.

Computer Readable Storage Medium

Any one or more of the embodiments described herein can be implemented using computer readable storage medium and computer-executable instructions which reside, for example, in computer-readable medium of a computer system or like device. The computer readable storage medium can be any kind of memory that instructions can be stored on. Examples of the computer readable storage medium include but are not limited to a disk, a compact disk (CD), a digital versatile device (DVD), read only memory (ROM), flash, and so on. As described above, certain processes and steps of embodiments of the present invention are realized, in one embodiment, as a series of instructions (e.g., software program) that reside within computer readable storage memory of a computer system and are executed by the processor of the computer system. When executed, the instructions cause the computer system to implement the functionality of the embodiments of the present invention.

CONCLUSION

Various embodiments have been described in various combinations. However, any two or more embodiments may be combined. Further, any embodiment may be used separately from any other embodiments.

Example embodiments of the subject matter are thus described. Although various embodiments of the subject matter have been described in a language specific to structural features and/or methodological acts, it is to be understood that the appended claims are not necessarily limited to the specific features or acts described above. Rather, the specific features and acts described above are disclosed as example forms of implementing the claims.

What is claimed is:

1. A computer implemented method of verifying a virtual machine, the method comprising:
obtaining (320) information (142, 144, 146, 148) about one or more attributes for a virtual machine (152, 154, 156, 158) from a host machine (120, 130) that the virtual machine (152, 154, 156, 158) executes on;
obtaining (330) one or more actual virtual machine attributes (162, 164, 166, 168) from the virtual machine (152, 154, 156, 158); and
determining (340):
if there are discrepancies between the information (142, 144, 146, 148) about the one or more attributes and the one or more actual virtual machine attributes (162, 164, 166, 168) by comparing the information (142, 144, 146, 148) about the one or more attributes to the one or more actual virtual machine attributes (162, 164, 166, 168);
if there are discrepancies between a virtual machine rule attribute (192, 194, 196, 198) and the information (142, 144, 146, 148) about the one or more attributes obtained from the host machine (120, 130); and
if there are discrepancies between the virtual machine rule attribute (192, 194, 196, 198) and the one or more actual virtual machine attributes (162, 164, 166, 168) obtained from the virtual machine (152, 154, 156, 158).

2. The computer implemented method as recited by claim 1: further comprising accessing (401) one or more expected virtual machine attributes (182, 184, 186, 188) from a network map (170); and
wherein the determining (340) if there are discrepancies further comprises
determining (402) if there are discrepancies between the one or more expected virtual machine attributes (182, 184, 186, 188), provided by the network map (170), and the information (142, 144, 146, 148) about the one or more attributes obtained from the host machine (120), and
determining (403) if there are discrepancies between the one or more expected virtual machine attributes (182, 184, 186, 188), provided by the network map (170), and the one or more actual virtual machine attributes (162, 164, 166, 168) obtained from the virtual machine (152, 154, 156, 158).

3. The computer implemented method as recited by claim 2:
further comprising accessing (404) rules (190) to obtain one or more virtual machine rule attributes (192, 194, 196, 198) for the virtual machine (152, 154, 156, 158); and
wherein the determining (340) if there are discrepancies further comprises determining (405) if there are discrepancies between the one or more expected virtual machine attributes (182, 184, 186, 188) from the network map (170) and the virtual machine rule attributes (192, 194, 196, 198).

4. The computer implemented method as recited by claim 1, wherein the attributes are selected from a group consisting of a number of processors allocated to the virtual machine (152, 154, 156, 158), the amount of memory allocated to the virtual machine (152, 154, 156, 158), the number and size of storage disks used by the virtual machine (152, 154, 156, 158), the maximum input/output (110) rate of a disk channel, the number of Network Interface Cards (NICs) associated with the virtual machine (152, 154, 156, 158) and the maximum I/0 rate for each NIC associated with the virtual machine (152 154, 156, 158).

5. An apparatus for verifying a virtual machine, the apparatus comprising:
a processor for executing instructions; and a computer-readable medium with the instructions that the processor executes stored on the computer-readable medium, wherein the processor executes tile instructions that implement:
a virtual-machine-attributes-information-accessor (210) configured for obtaining (320) information (142, 144, 146, 148) about one or more attributes for a virtual machine (152, 154, 156, 158) from a host machine (120, 130) that the virtual machine (152, 154, 156, 158) executes on;
an actual-virtual-machine-attributes-accessor (220) configured for obtaining (330) one or more actual virtual machine attributes (162, 164, 166, 168) from the virtual machine (152, 154, 156, 158); and
a virtual-machine-attributes-discrepancy-determiner (230) configured for determining (340):
if there are discrepancies between the information (152, 154, 156, 158) about the attributes and the one or more actual virtual machine attributes (162, 164, 166, 168) by comparing the information (142, 144, 146, 148) about the attributes to the one or more actual virtual machine attributes (162, 164, 166, 168);
if there are discrepancies between a virtual machine rule attribute (192, 194, 196, 198) and the information (142, 144, 146, 148) about the one or more attributes obtained from the host machine (120, 130); and
if there are discrepancies between the virtual machine rule attribute (192, 194, 196, 198) and the one or more actual virtual machine attributes (162, 164, 166, 168) obtained from the virtual machine (152, 154, 156, 158).

6. The apparatus of claim 5, further comprising: an expected-virtual-machine-attributes-accessor (240) configured for accessing (401) one or more expected virtual machine attributes (182, 184, 186, 188) from a network map (I 70); and the virtual-machine-attributes-discrepancy-determiner (230) configured for determining (402) if there are discrepancies between the one or more expected virtual machine attributes (182, 184, 186, 188), provided by the network map (170), and the information (142, 144, 146, 148) about the one or more attributes obtained from the host machine (120), and determining (403) if there are discrepancies between the one or more expected virtual machine attributes (182, 184, 186, 188), provided by the network map (170), and the one or more actual virtual machine attributes (162, 164, 166, 168) obtained from tile virtual machine (152, 154, 156, 158).

7. The apparatus of claim 6, further comprising: a virtual-machine-rule-attributes-accessor (250) configured for accessing (404) rules (190) to obtain one or more virtual machine rule attributes (192, 194, 196, 198) for the virtual machine (152, 154, 156, 158); and the virtual-machine-attributes-discrepancy-determiner (230) configured for determining (405) if there are discrepancies between the one or more expected virtual machine attributes (182, 184, 186, 188) from the network map (170) and the virtual machine rule attributes (192, 194, 196, 198).

8. The apparatus of claim 5, wherein the apparatus further comprises:
a location accessor configured for accessing a location (1721, 1722) of the host machine (120, 130) and a location (1741, 1742, 1743, 1744) of the virtual machine (152, 154, 156, 158), wherein the locations (1721, 1722, 1741, 1742, 1743, 1744) of the host machine and the virtual machine (152, 154, 156, 158) are stored in a network map (170);

the virtual-machine-attributes-information-accessor (310) uses the location (1721, 1722) of the host machine as a part of obtaining (320) the information (142, 144, 146, 148) about attributes; and the actual-virtual-machine-attributes-accessor (320) uses the location 1741, 1742, 1743, 1744). of the virtual machine as a part of obtaining (340) the one or more actual virtual machine attributes (162, 164, 166, 168).

9. A non-transitory computer readable storage medium having computer-readable program instructions stored thereon for causing a computer system to perform a method of verifying a virtual machine, the method comprising:

obtaining (320) information (142, 144, 146, 148) about one or more attributes for a virtual machine (152, 154, 156, 158) from a host machine (120, 130) that the virtual machine (152, 154, 156, 158) executes on;

obtaining (330) one or more actual virtual machine attributes (162, 164, 166, 168) from the virtual machine (152, 154, 156, 158); and determining (340):

if there are discrepancies between the information (142, 144, 146, 148) about the one or more attributes and the one or more actual virtual machine attributes (162, 164, 166, 168) by comparing the information (142, 144, 146, 148) about the one or more attributes to the one or more actual virtual machine attributes (162, 164, 166, 168);

if there are discrepancies between a virtual machine rule attribute (192, 194, 196, 198) and the information (142, 144, 146, 148) about the one or more attributes obtained from the host machine (120, 130); and if there are discrepancies between the virtual machine rule attribute (192, 194, 196, 198) and the one or more actual virtual machine attributes (162, 164, 166, 168) obtained from the virtual machine (152, 154, 156, 158).

10. The non-transitory computer readable storage medium of claim 9:

wherein the method further comprises accessing (401) one or more expected virtual machine attributes (182, 184, 186, 188) from a network map (170); and wherein the determining (340) if there are discrepancies further comprises instructions for determining (402) if there are discrepancies between the one or more expected virtual machine attributes (182, 184, 186, 188), provided by the network map (170), and the information (142, 144, 146, 148) about the one or more attributes obtained from the host machine (120, 130), and determining (403) if there are discrepancies between the one or more expected virtual machine attributes (182, 184, 186, 188), provided by tile network map (170), and the one or more actual virtual machine attributes (162, 164, 166, 168) obtained from the virtual machine (152, 154, 156, 158).

11. The non-transitory computer readable storage medium of claim 10: wherein the method further comprises accessing (404) rules (190) to obtain one or more virtual machine rule attributes (192, 194, 196, 198) for the virtual machine (152, 154, 156, 158); and wherein the determining (340) if there are discrepancies further comprises instructions for determining (405) if there are discrepancies between the one or more expected virtual machine attributes (182, 184, 186, 188) from the network map (170) and the virtual machine rule attributes (192, 194, 196, 198).

12. Tile non-transitory computer readable storage medium of claim 9, wherein the method further comprises:

using a utility con[roller to automatically update the network map (170), wherein the utility controller is associated with a utility data center that automatically provisions the host machine (120, 130).

\* \* \* \* \*

UNITED STATES PATENT AND TRADEMARK OFFICE
CERTIFICATE OF CORRECTION

| | | |
|---|---|---|
| PATENT NO. | : 8,732,703 B2 | Page 1 of 1 |
| APPLICATION NO. | : 13/146119 | |
| DATED | : May 20, 2014 | |
| INVENTOR(S) | : David Graves | |

It is certified that error appears in the above-identified patent and that said Letters Patent is hereby corrected as shown below:

In the Claims

In column 13, line 66, in Claim 4, delete "(110)" and insert -- (I/O) --, therefor.

In column 14, line 2, in Claim 4, delete "(1/0)" and insert -- (I/O) --, therefor.

In column 14, line 9, in Claim 5, delete "tile" and insert -- the --, therefor.

In column 14, line 42, in Claim 6, delete "(1 70);" and insert -- (170); --, therefor.

In column 14, line 52, in Claim 6, delete "tile" and insert -- the --, therefor.

In column 15, line 11, in Claim 8, delete "1744)." and insert -- 1744) --, therefor.

In column 16, line 17, in Claim 10, delete "tile" and insert -- the --, therefor.

In column 16, line 32, in Claim 12, delete "tile" and insert -- The --, therefor.

In column 16, line 34, in Claim 12, delete "con[roller" and insert -- controller --, therefor.

Signed and Sealed this
Twenty-first Day of April, 2015

Michelle K. Lee
*Director of the United States Patent and Trademark Office*